US005805179A

United States Patent [19]

Taylor et al.

[11] Patent Number: 5,805,179

[45] Date of Patent: Sep. 8, 1998

[54] AUXILIARY PRINTER FOR OFFICE MACHINE

[75] Inventors: Thomas N. Taylor, Rochester; Robert A. Panos, Penfield, both of N.Y.

[73] Assignee: Xerox Corporation, Stamford, Conn.

[21] Appl. No.: 885,471

[22] Filed: Jun. 30, 1997

Related U.S. Application Data

[63] Continuation of Ser. No. 368,060, Jan. 3, 1995, abandoned.

[51] Int. Cl.[6] .......................... B41J 29/377; H04N 1/034

[52] U.S. Cl. .................................................. 347/18; 347/3

[58] Field of Search .................................. 347/3, 18, 17, 347/16, 86

[56] References Cited

U.S. PATENT DOCUMENTS

| | | | |
|---|---|---|---|
| 4,373,799 | 2/1983 | Snelling et al. . | |
| 4,800,398 | 1/1989 | Naruse et al. . | |
| 4,857,955 | 8/1989 | Crandall . | |
| 4,970,533 | 11/1990 | Saito et al. . | |
| 5,081,596 | 1/1992 | Vincent et al. . | |
| 5,174,556 | 12/1992 | Taylor et al. . | |
| 5,243,394 | 9/1993 | Matsuno et al. . | |
| 5,245,365 | 9/1993 | Woodard et al. . | |
| 5,291,215 | 3/1994 | Nozawa et al. . | |
| 5,321,467 | 6/1994 | Tanaka et al. | 347/3 |
| 5,392,063 | 2/1995 | Rhoads | 347/86 |

FOREIGN PATENT DOCUMENTS

| | | | |
|---|---|---|---|
| 0124225 | 7/1989 | Japan | 347/18 |

*Primary Examiner*—Valerie Lund
*Attorney, Agent, or Firm*—Fay, Sharpe, Beall, Fagan, Minnich & McKee

[57] ABSTRACT

An office machine having a pair of printers includes a machine frame and a first printer mounted on the frame. A sheet transport assembly is mounted on the frame for moving sheets past the first printer along a sheet path. A second printer includes a printer cartridge having a cartridge frame and a thermal ink jet print head secured to the cartridge frame. An ink supply container is selectively secured to the cartridge frame so that it communicates with the ink jet print head. The ink supply container can be selectively removed from the cartridge frame. A carriage is mounted on the office machine frame so that the carriage can move in relation to the sheet path. The printer cartridge is removably mounted on the carriage. The carriage enables the printer cartridge to be selectively brought to a desired location in relation to the sheet path to allow the printer cartridge to print on a sheet travelling therepast.

24 Claims, 6 Drawing Sheets

FIG. 2
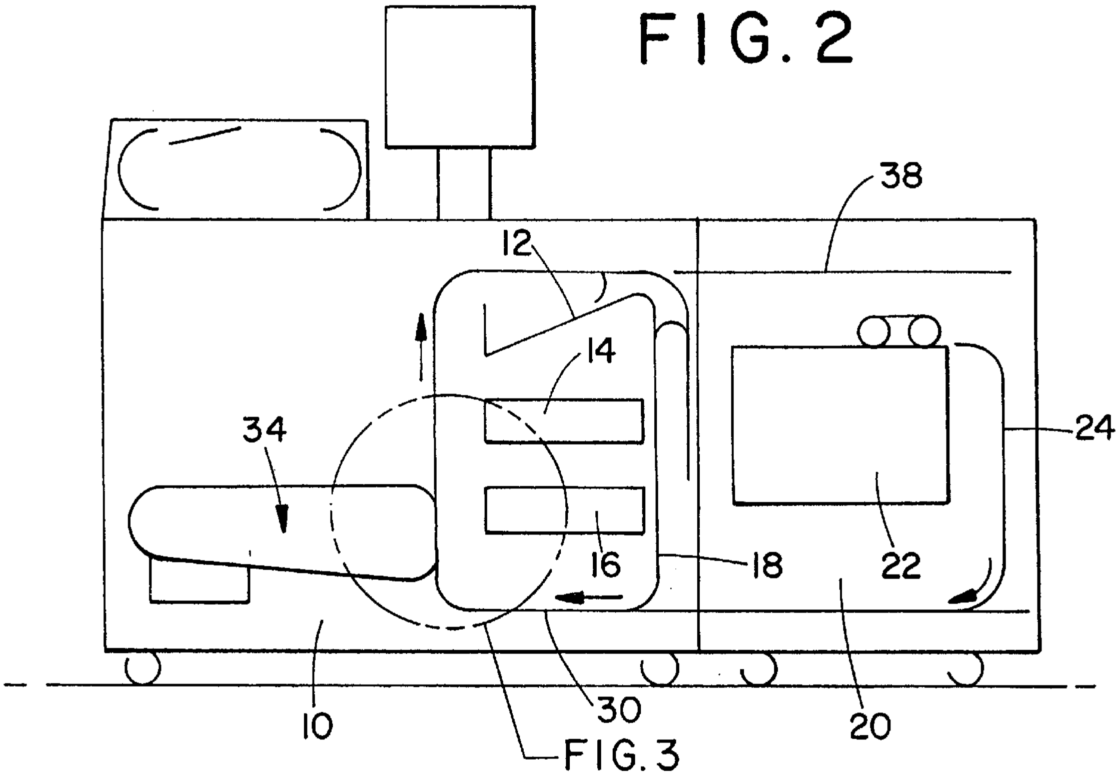
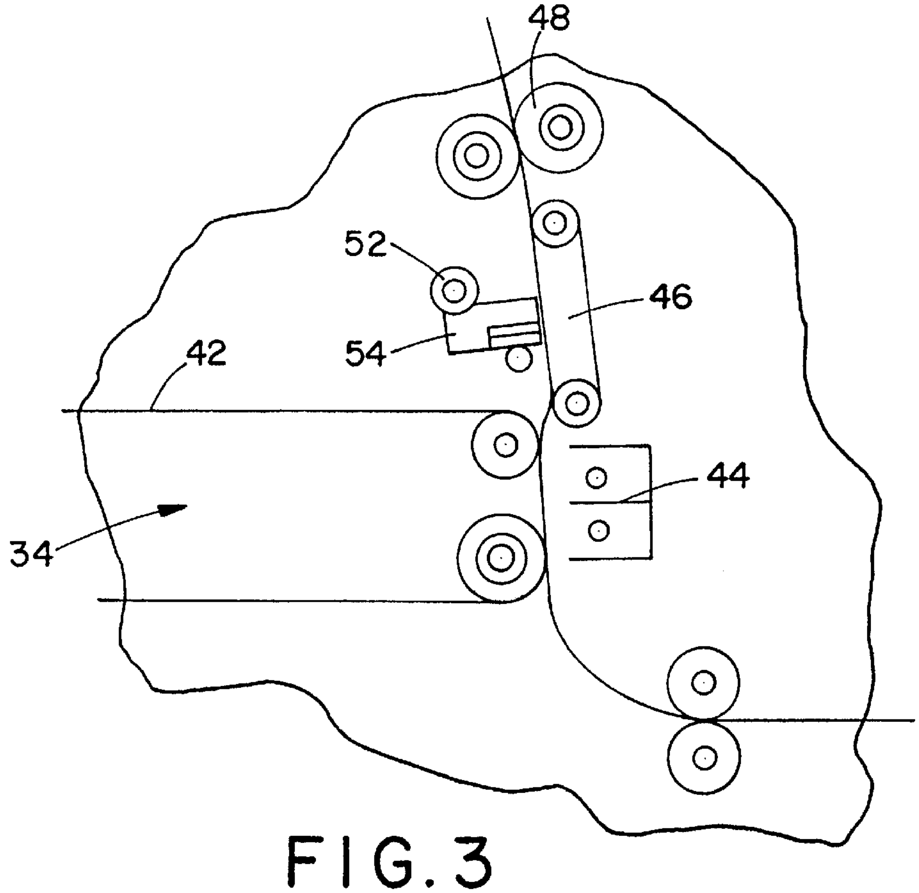
FIG. 3

AUXILIARY PRINTER FOR OFFICE MACHINE

This is a continuation of U.S. application Ser. No. 08/368,060 filed Jan. 3, 1995 now abandoned.

BACKGROUND OF THE INVENTION

This invention relates to office machines. More particularly, the present invention relates to an auxiliary printer for an office machine.

One such office machine is an electrophotographic printing apparatus. In apparatus of this type commonly used today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as "toner." Most development systems employ developer which comprises both charged carrier particles and charged toner particles which triboelectrically adhere to the carrier particles. During development, the toner particles are attracted from the carrier particles by the charged pattern of the image areas of the photoconductive insulating area to form a powder image on the photoconductive area. This toner image may be subsequently transferred to a support surface, such as a sheet of copy paper to which it may be permanently affixed by heating or by the application of pressure.

In commercial applications of such products, the photoconductive member has typically been configured in the form of a belt or drum moving at high speed in order to provide high speed multiple copying from an original document.

It is known to have a reproduction machine such as an electrophotographic copier with a main copying station for copying a set of documents. After the documents are copied, they are bound. A document finishing section of such a machine can include a printing station for printing on the binding of a book. The printing station can print on a binder tape before the book is bound, or the printer can print directly on the binding after the book is bound. Either ink jet printers or impact type printers can be utilized. Such an apparatus is disclosed in U.S. Pat. No. 5,174,556. Although this known apparatus prints on the binding of a book, it does not enable printing directly on each sheet of paper as it emerges from the printer station of the electrophotographic copier.

However, it is now considered desirable to provide a machine operator the option of producing a printed sheet which has on it not only the information from a primary printer, but also an auxiliary printed indicium produced by an auxiliary printer which is selectively employed.

It would also be advantageous to allow the auxiliary printer to be readily detached from the office machine for replacement or maintenance as desired. Moreover, it would be advantageous to allow the user of the office machine to custom mix a desired color of ink for the auxiliary printer, or to use different colors of ink for different printing jobs.

Ink jet printing units are by now well known. Ink jet printers which are encased in a printer head unit and which are detachably mounted on a carriage are also known. One such unit is disclosed in U.S. Pat. No. 4,800,398. However, it would be advantageous to provide an ink jet printer unit which is readily detachable from its carriage and which has an on board and readily detachable ink container.

Accordingly, it has been considered desirable to develop a new and improved office machine having a pair of printers which would overcome the foregoing difficulties and others while providing better and more advantageous overall results.

BRIEF SUMMARY OF THE INVENTION

In accordance with the present invention a new and improved office machine having a pair of printers is provided.

More particularly in accordance with the invention, the office machine comprises an office machine frame and a first printer mounted on the frame. A sheet transport assembly is mounted on the frame for moving sheets past the first printer along a sheet path. A second printer comprises a printer cartridge which comprises a cartridge frame and a thermal ink jet print head secured to the cartridge frame. An ink supply container comprises a securing means for selectively securing the ink supply container to the cartridge frame so that it communicates with the ink jet print head. A carriage is mounted on the office machine frame so that the carriage can move in relation to the sheet path. The printer cartridge is removably mounted on the carriage. The carriage enables the printer cartridge to be selectively brought to a desired location in relation to the sheet path to allow the printer cartridge to print on a sheet travelling therepast.

If desired, the cartridge frame can comprise a prong which is selectively securable in a socket of the carriage to secure the printed cartridge to the carriage. The cartridge frame can further comprise a socket and the carriage can comprise a prong which is selectively securable in the socket. Preferably the carriage comprises an endless belt mounted between a pair of pulleys, a motor having a drive shaft engaging a first of a pair of pulleys and a coupling means for securing the carriage to the endless belt.

If desired, the office machine can comprise a cooling system for the ink jet print head, the cooling system comprising a cooling manifold secured to the ink jet print head, a coolant supply reservoir secured to the office machine, a cooling fluid inlet line having a first end communicating with the coolant supply reservoir and a second end communicating with the cooling manifold, a cooling fluid outlet line having a first end communicating with the coolant supply reservoir and a second end communicating with the cooling manifold in a manner spaced from the cooling fluid inlet line and a pump communicating with the coolant supply reservoir for pumping cooling fluid into the cooling fluid inlet line.

The office machine can, if desired, have a vacuum cleaner mounted on the machine frame for cleaning waste ink from the thermal ink jet print head. The office machine, preferably, further comprises a leading edge sensor mounted on the machine frame for sensing a leading edge of a sheet being transported by the sheet transport assembly. If desired, the office machine can further comprise a drop sensor mounted on the machine frame for sensing drops of ink from the ink jet print head.

In accordance with another aspect of the present invention, a method is provided for printing on a sheet.

More particularly in accordance with the method, provided are a first printer, a second printer mounted on a movable carriage, and a sheet transport assembly, which moves a sheet along a sheet path. A sheet is moved past the first printer along the sheet path. The first printer is employed to print on the sheet. A carriage drive assembly is selectively actuated to move the carriage on which the second printer is mounted in order to move the second printer into the sheet path. The second printer is then employed to print on the sheet travelling therepast.

Preferably, the second printer includes a frame and an ink cartridge secured thereto. The method can further comprise the steps of selectively removing the ink cartridge from the second printer frame and replacing the ink cartridge with another ink cartridge of a different color. Preferably, the second printer is connected to a programming means by which the functioning of the second printer can be regulated. The method can further comprise the step of programming the second printer to print a desired indicium on the sheet travelling therepast.

One advantage of the present invention is the provision of a new and improved office machine.

Another advantage of the present invention is the provision of an office machine having a main printer and an auxiliary printer, which enables the printing of additional information on a sheet that has been printed on by the main printer.

Still another advantage of the present invention is the provision of an office machine having an easily replaceable auxiliary printer which can readily be attached to or detached from a carriage movably mounted on the office machine.

Yet another advantage of the present invention is the provision of an office machine with an auxiliary printer having a readily removable ink container. In this way, a user can detach the ink container and custom mix ink for custom colors or use a selected ink container with premixed colors. Also, an ink container for the printer can be readily replaced with another ink container as desired.

A further advantage of the present invention is the provision of an office machine in which an auxiliary printer can be selectively positioned anywhere across the width of a sheet and at any desired location along the length of a sheet to print on the sheet a desired piece of information. When the auxiliary printer is not needed, the carriage is moved out of the sheet path.

A still further advantage of the present invention is the provision of a method for printing on a sheet employing a first printer to print desired information on the sheet and a second auxiliary printer which can be selectively actuated to print additional information on the sheet.

Still other benefits and advantages of the invention will become apparent to those skilled in the art upon a reading and understanding of the following detailed specification.

BRIEF DESCRIPTION OF THE DRAWINGS

The invention may take form in a certain structure, a preferred embodiment of which will be described in detail in this specification and illustrated in accompanying drawings. In the drawings:

FIG. 2 is a side elevational schematic view of the office machine of FIG. 1 on a reduced scale;

FIG. 3 is an enlarged schematic view of a portion of the office machine of FIG. 2;

DETAILED DESCRIPTION OF THE PREFERRED EMBODIMENT

Figure 1:
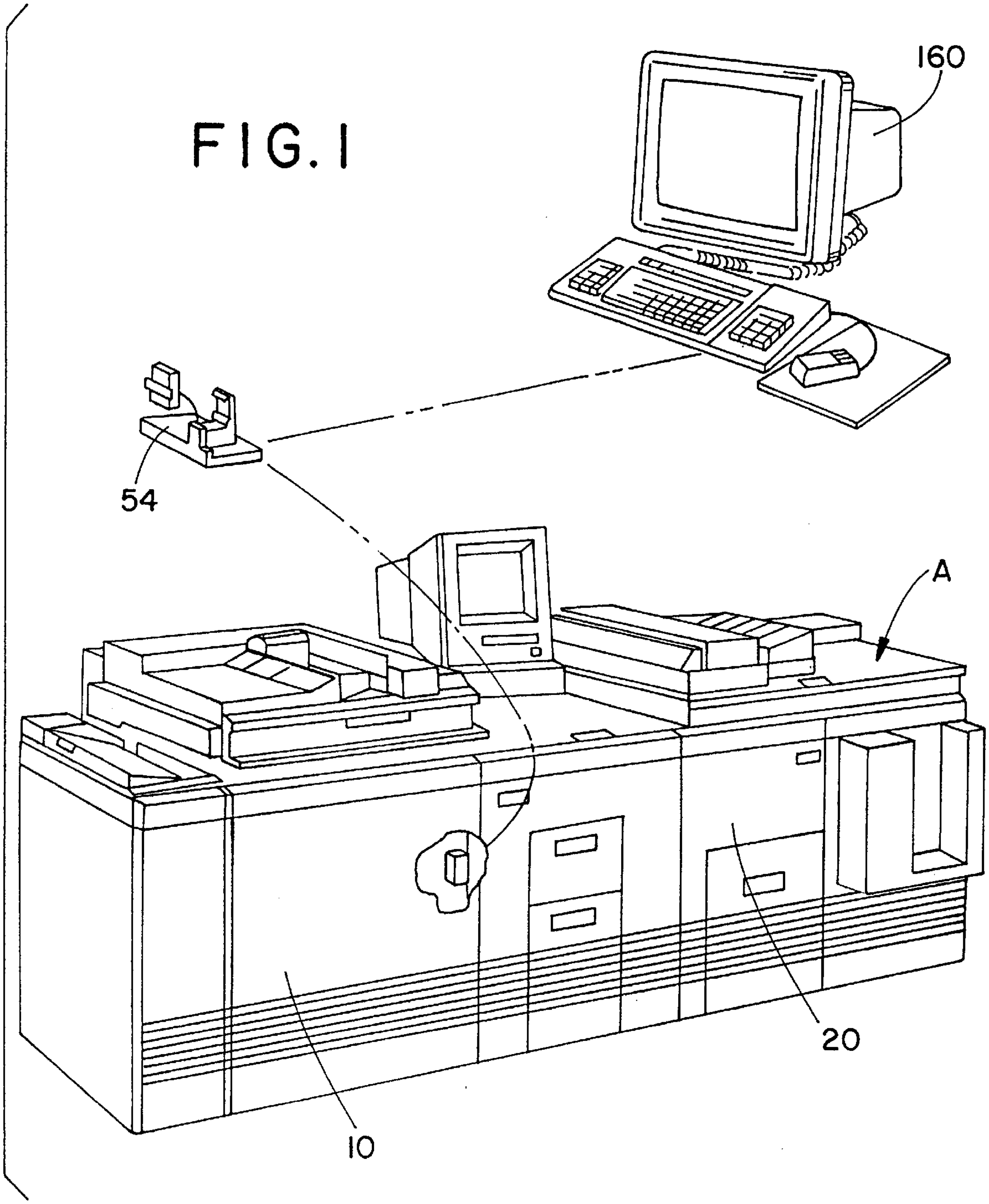
FIG. 1 is a perspective view, partially broken away, of an office machine according to the present invention.

Referring now to the drawings, wherein the showings are for purposes of illustrating a preferred embodiment of the invention only and not for purposes of limiting same, FIG. 1 shows an office machine A according to the present invention. While the office machine is illustrated to be an electrophotographic printing apparatus in the form of a particular type of photocopier, it should be appreciated by those of average skill in the art that the apparatus disclosed could also be utilized in numerous other types of printing operations.

With reference now also to FIG. 2, the office machine A can comprise a first housing 10 containing a first sheet tray 12, a second sheet tray 14 and a third sheet tray 16 in spaced relationship to each other. Usually, these trays contain different sized sheets so that a sheet from a desired one of the trays can be fed along a first sheet path 18. The office machine can, if desired, also comprise a second housing 20 having a fourth sheet tray 22 contained therein. Sheets from the fourth sheet tray 22 can be transported via a second sheet path 24 into the first housing 10. The two sheet paths 18 and 24 merge to create a third sheet path 30. The third sheet path carries the sheets past a first printer 34. The sheets then continue to travel along the third sheet path 30 to an output station 38 which can, if desired, be located in the second housing 20.

With reference now also to FIG. 3, the first printer 34 can comprise an endless belt 42 of an electrostatographic printing apparatus. Sheets travel along the third sheet path 30 to an image transfer station 44 which transfers an image from the belt 42 to the sheet. After having been processed at the image transfer station 44, the sheets then travel to a vacuum transport station 46 and then to a fuser station 48. Located at the vacuum transport station 46 is a carriage assembly 52 containing an auxiliary printer cartridge 54 according to the present invention.

Figure 4:
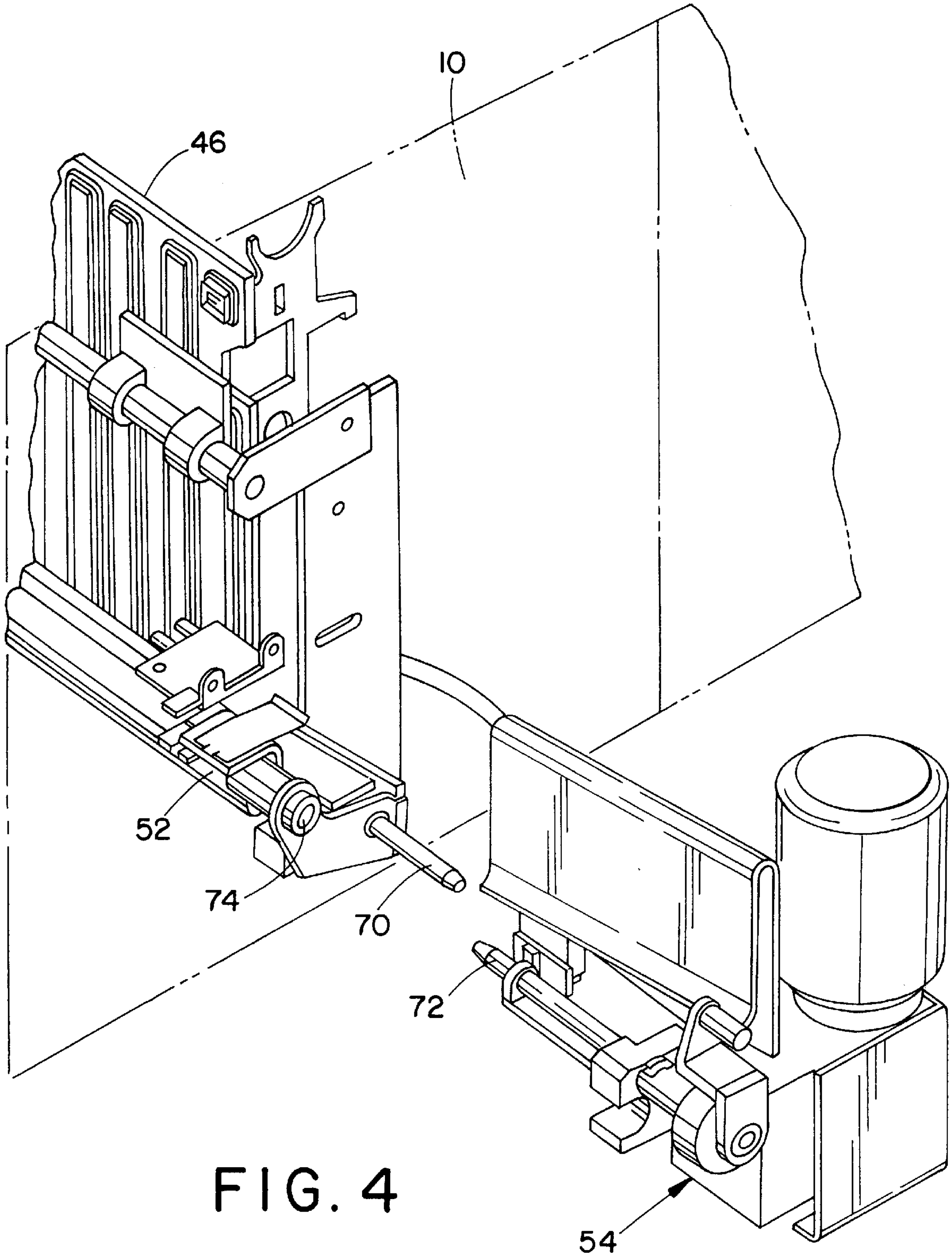
FIG. 4 is an enlarged exploded perspective view of an ink jet printer cartridge and a carriage transport assembly therefor of the office machine of FIG. 3.

With reference now also to FIG. 4, the printer cartridge 54 can be a plug-in cartridge which can be selectively attached to and detached from the carriage assembly 52. It is noted that the carriage assembly 52 reciprocates across the width of the sheet transport station 46. This enables the printing of a desired piece of information onto the sheet at a desired location across the width of the sheet. In addition, as the sheet is moved longitudinally past the printer 54 by the sheet transport 46, the location of the printed image along the length of the sheet can also be controlled.

Figure 6:
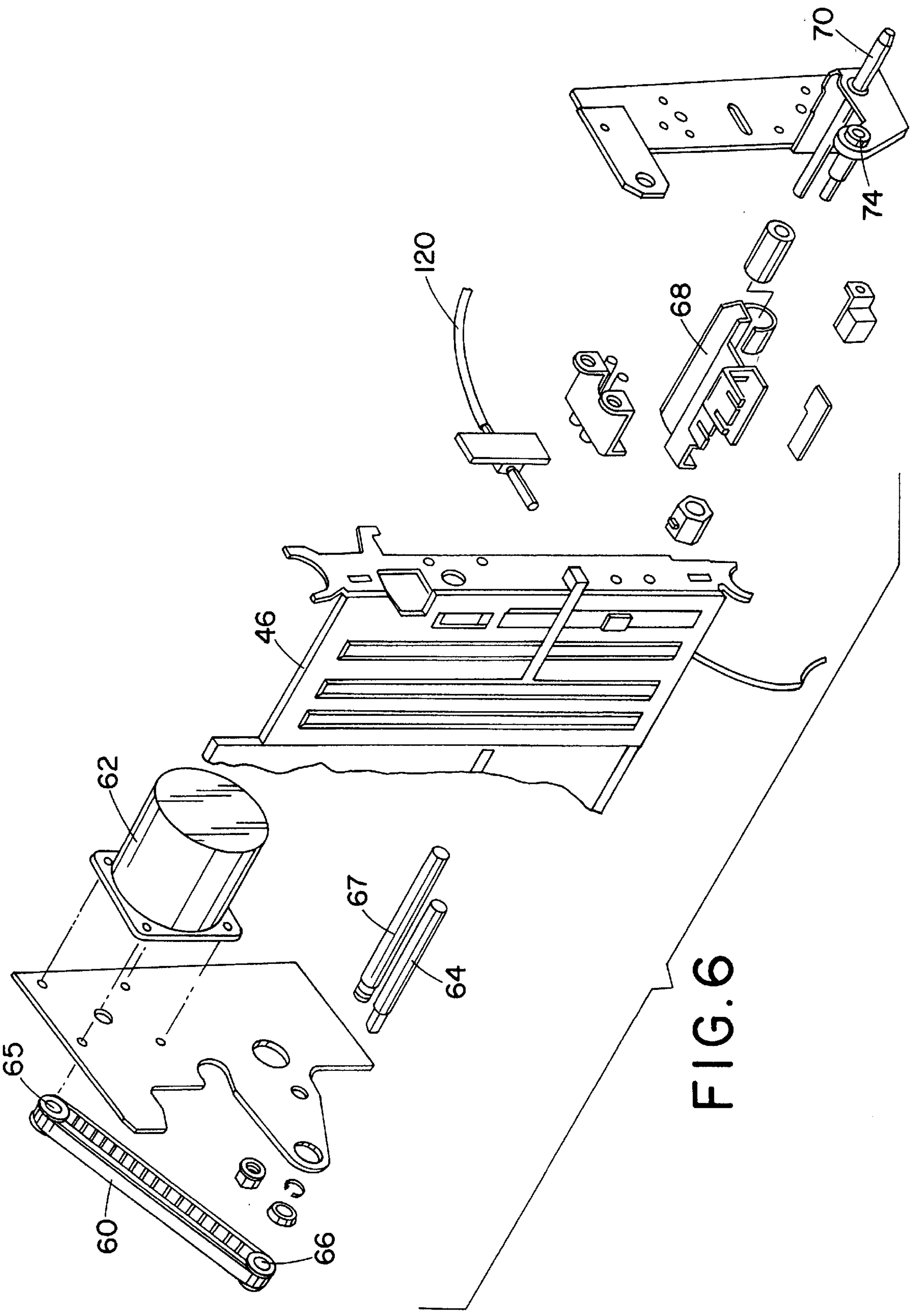
FIG. 6 is an exploded perspective view of the carriage transport assembly of the office machine of FIG. 4; and, FIG. 7 is a schematic view of the office machine of FIG. 2 illustrating the various ancillary systems involved with the auxiliary printer.

With reference now to FIG. 6, the carriage assembly comprises an endless belt 60 and a motor 62 which actuates a drive screw 64 that has an end engaging a drive pulley 65. The belt 60 is stretched between the drive pulley and a guide pulley 66 which is engaged by a guide shaft 67. A carriage 68 is secured to the belt so that rotation of the belt by the motor 62 will move the carriage 68 across the width of the sheet transport station 46.

With reference again to FIG. 4, a guide pin 70 fastened to the carriage assembly 52 engages in a suitable socket (not visible) on the printer cartridge 54. A second guide pin 72 fastened to the printer cartridge 54 engages in a socket 74 and the carriage assembly 52 to selectively hold the printer cartridge 54 to the carriage assembly 52.

Figure 5:
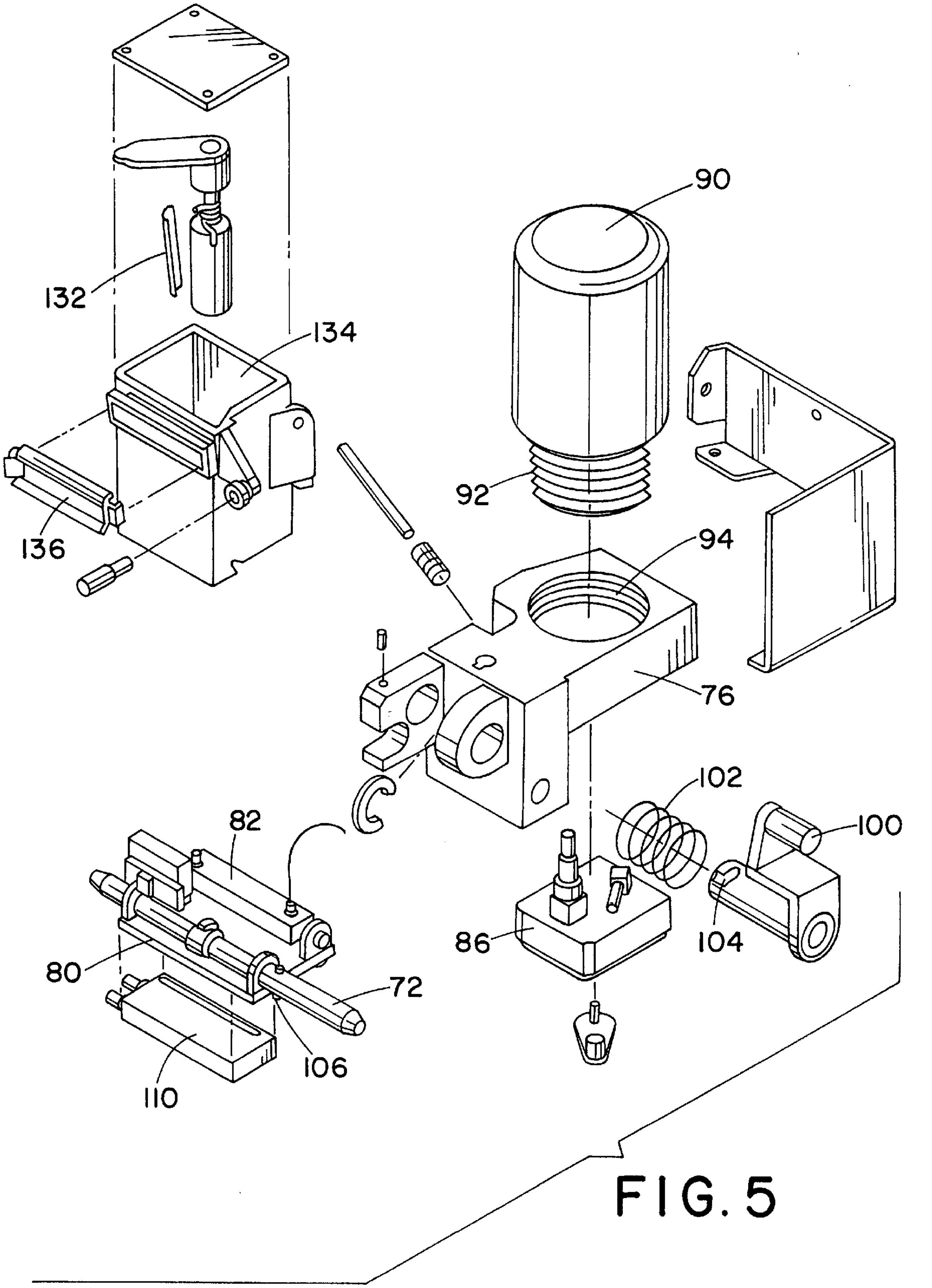
FIG. 5 is an exploded perspective view of the ink jet printer cartridge assembly of the office machine of FIG. 4.

With reference now also to FIG. 5, the printer cartridge 54 comprises a cartridge frame 76 to which can be secured a thermal ink jet print head 80. The print head comprises an ink manifold 82 and an ink line leading from the manifold to an ink supply control 86. These are secured to the cartridge frame 76. An ink container 90 is selectively secured to the cartridge frame by means of a threaded mouth 92 thereof interengaging with a suitably threaded opening 94 on the frame. In this way, the ink supply held in the container can be replaced with an ink container having ink of another suitable color, if that is desired. Custom mixed ink colors can thus be employed.

A lever lock 100, which is biased by a spring 102 and has an L-shaped slot 104, cooperates with a transversely extending stub 106 on the guide pin 74 to selectively lock the thermal ink jet print head 80 to the frame 76. Provided underneath the ink jet print head is a cooling manifold 110.

Figure 7:
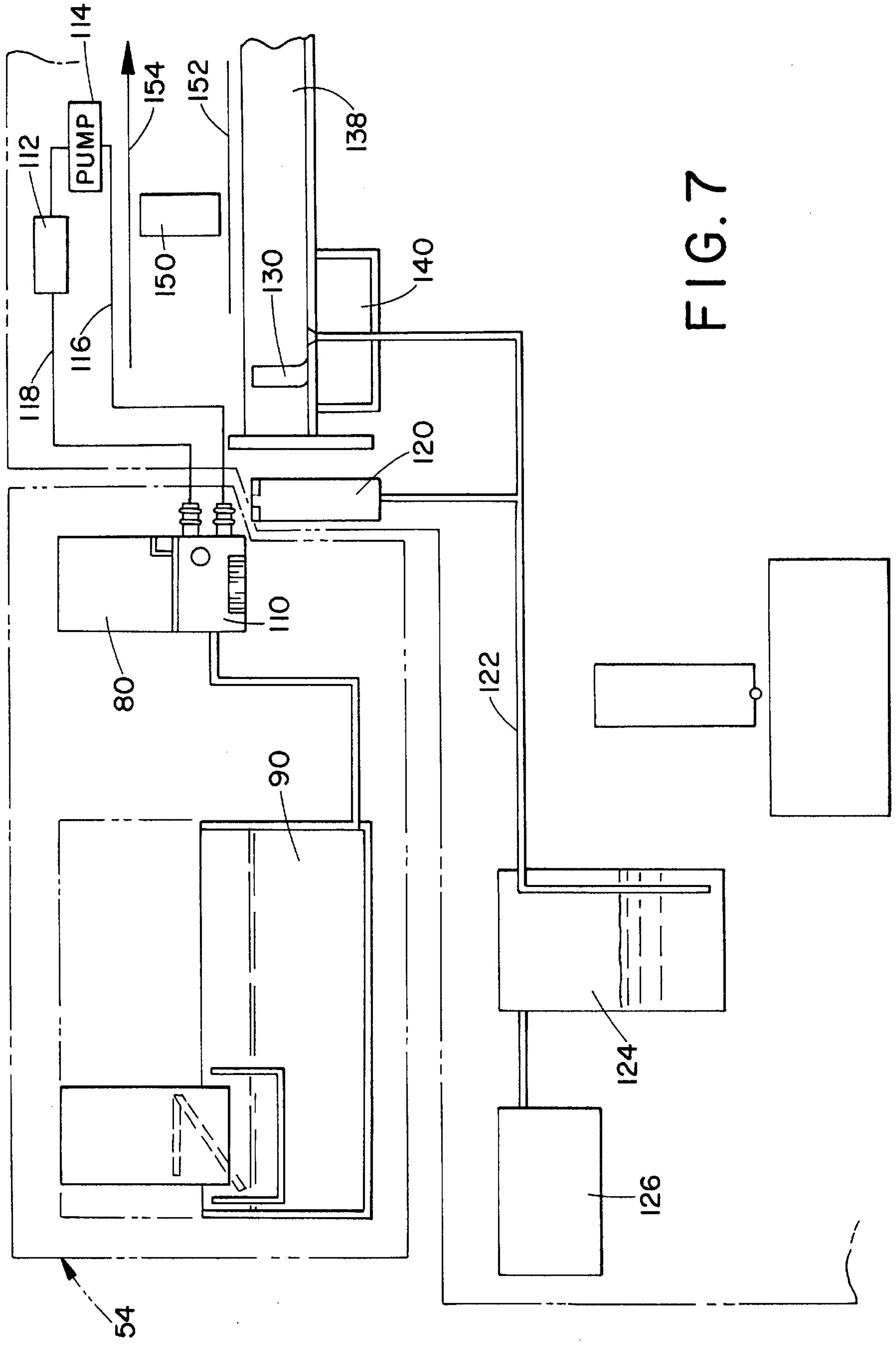

With reference now also to FIG. 7, the customer replaceable printer cartridge 54 includes, as mentioned, the ink supply cartridge 90, the thermal ink jet print head 80 and cooling manifold 110. If desired, a heater (not illustrated) can be provided to heat the ink supply held in the cartridge.

The cooling manifold cooperates with a supply reservoir 112 held on the machine frame 20. Cooling fluid is pumped from the reservoir 112 by a pump 114 to a cooling fluid inlet line 116 which leads to the manifold 110. Leading away from the manifold is a cooling fluid outlet line 118 that communicates into the supply reservoir 112.

Also provided is a vacuum cleaner 120 for cleaning out the ink jet as it travels towards the sheet to be printed on. The vacuum cleaner 120 includes a line 122 leading to a waste ink reservoir 124. Drawing a vacuum in the waste ink reservoir 124 is a vacuum pump 126. As the print head 80 moves past the vacuum cleaner 120, the vacuum cleaner will clean the channels of the print head.

Also provided on the office machine frame is a wet wipe assembly 130. The wet wipe assembly 130 can, as illustrated in FIG. 5, include a wick 132, a fluid container 134 and a cap seal 136, as is well known in the art. The wet wipe disclosed employs the wick 132 to draw fluid from the fluid container 134 and communicate the fluid to a contact surface to contact the ink jet print head travelling therepast. The contact surface can be made of felt or a like material.

As is well known in the art, it is necessary to keep the thermal ink head humid. The capping system and a water supply prevent the ink jet print head from drying out.

With reference again to FIG. 7, the office machine frame further supports a spit gutter 138 into which any fluid released from the wet wipe falls. A drop sensor 140 senses whether ink droplets or other fluid droplets are emanating from the ink jet printer 80. The drop sensor senses any missing jets of ink from the print head. That is, if one of the jets is clogged, then the sensor will direct the print head to go through the maintenance cycle again. Namely, the print head will be again vacuumed and wet wiped to clear the clogged jet. The vacuum system cleans out the ink jets and then the wet wiper wipes off dried ink and dirt. Thereafter, the drop sensor insures that all of the ink jets are firing.

Further provided on the office machine frame is a leading edge sensor 150 which senses a leading edge of a sheet 152 travelling therepast on the sheet transport 46 so as to correctly time the movement of the carriage supporting the thermal ink jet print head 80 in relation to the sheet 152 intended to be printed on. The direction of movement of the thermal ink jet print head 80 is illustrated by arrow 154 in FIG. 7. When it is desired to print on the sheet 152 by means of the auxiliary printer, the drive is actuated and the ink jet print head 80 is traversed over the sheet 152 in order that the sheet have printed on it the desired information at the desired location. It should be evident that the printer moves across the width of the sheet transport assembly 46 as is necessary. When not in use, the carriage 52 moves the print head past the side edge of the sheet transport assembly and, therefore, out of the way of the sheet transport assembly.

The auxiliary printer according to the present invention can print, e.g., a desired trademark or logo, in a desired color, on a sheet which has been photocopied on, e.g., a very fast black and white photocopying machine. Several different colors can be provided and the customer can mix colors simply by use of the detachable and replaceable ink containers 90. It is noted that the print head disclosed is not the full width of the paper that is being photocopied but is only about 1½ inches wide. However, it should be appreciated that wider or narrower print heads can also be provided as may be desired.

The information printed by the thermal ink jet print head 80 can be controlled by a suitable computer such as the computer 160 illustrated in FIG. 1. In this way, the desired information can be printed on a sheet by the auxiliary printer 80 as may be programmed for a particular job.

The invention has been described with reference to a preferred embodiment. Obviously, modifications and alterations will occur to others upon the reading and understanding of this specification. It is intended to include all such modifications and alterations insofar as they come within the scope of the appended claims or any equivalents thereof.

What is claimed is:

1. An office machine having a pair of printers, comprising:

an office machine frame;

a first printer mounted on said frame;

a sheet transport assembly mounted on said frame for moving sheets past said first printer along a sheet path;

a second printer, comprising:

a printer cartridge comprising:

a cartridge frame, and a thermal ink jet print head secured to said cartridge frame, an ink supply container comprising a securing means for selectively securing said ink supply container to said cartridge frame so that it communicates with said ink jet print head;

a carriage mounted on said office machine frame so that said carriage can move in relation to said sheet path, said printer cartridge being removably mounted on said carriage, said carriage enabling said printer cartridge to be selectively brought to a desired location in relation to said sheet path to allow said printer cartridge to print on a sheet traveling therepast; and, programming means operatively coupled to said second printer to control information printed by said ink jet print head.

2. The office machine of claim 1 wherein said cartridge frame comprises a first prong which is selectively securable in a first socket of said carriage to secure said printer cartridge to said carriage.

3. The office machine of claim 2 wherein said cartridge frame further comprises a second socket and said carriage comprises a second prong which is selectively securable in said second socket.

4. The office machine of claim 1 wherein said carriage comprises:

an endless belt mounted between a pair of pulleys;

a motor having a drive shaft engaging a first of said pair of pulleys; and, a coupling means for securing said carriage to said endless belt.

5. The office machine of claim 1 further comprising a cooling system for said ink jet print head, said cooling system comprising:

a cooling manifold secured to said ink jet print head;

a coolant supply reservoir secured to said office machine;

a cooling fluid inlet line having a first end communicating with said coolant supply reservoir and a second end communicating with said cooling manifold;

a cooling fluid outlet line having a first end communicating with said coolant supply reservoir and a second end communicating with said cooling manifold in a manner spaced from said cooling fluid inlet line; and, a pump communicating with said coolant supply reservoir for pumping cooling fluid into said cooling fluid inlet line.

6. The office machine of claim 1 further comprising a vacuum cleaner mounted on said office machine frame proximate said thermal ink jet print head for cleaning waste ink from said thermal ink jet print head when said thermal ink jet print head moves past said vacuum cleaner.

7. The office machine of claim 1 further comprising a leading edge sensor mounted on said office machine frame for sensing a leading edge of a sheet being transported by said sheet transport assembly.

8. The office machine of claim 1 further comprising a drop sensor mounted on said office machine frame for sensing drops of ink from said ink jet print head.

9. The office machine of claim 1, wherein said first printer is mounted to said frame at a position upstream from said second printer along said sheet path.

10. A selectively removable auxiliary printer for an office machine having a main printer, comprising:

an office machine frame including a sheet path for sheets which move past a main printer;

a carriage secured to said office machine frame so that said carriage can move in relation to said sheet path;

a printer cartridge removably mounted on said carriage, said printer cartridge comprising:

a cartridge frame, and a thermal ink jet print head supported by said cartridge frame;

an ink supply container supported by said cartridge frame; and, a coupler for removably securing said cartridge frame to said carriage so that said cartridge frame, said ink jet print head, and said ink supply container can be removed from and secured to said carriage as a single unit.

11. The printer of claim 10 further comprising an ink line mounted on said cartridge frame, said ink line having a first end communicating with said ink supply container and a second end communicating with said ink jet print head.

12. The printer of claim 10 further comprising an ink manifold secured to said ink jet print head and an ink line having a first end communicating with said ink supply container and a second end communicating with said ink manifold.

13. The printer of claim 10 further comprising an out of ink sensor secured to said ink jet print head.

14. The printer of claim 10 further comprising a cooling system for said ink jet print head, said cooling system comprising:

a cooling manifold secured to said ink jet print head;

a coolant supply reservoir secured to said office machine frame;

a cooling fluid inlet line having a first end communicating with said coolant supply reservoir and a second end communicating with said cooling manifold;

a cooling fluid outlet line having a first end communicating with said coolant supply reservoir and a second end communicating with said cooling manifold in a manner spaced from said cooling fluid inlet line; and, a pump communicating with said coolant supply reservoir for pumping cooling fluid into said cooling fluid inlet line.

15. The printer of claim 10 wherein said coupler comprises a first prong of said cartridge frame which is selectively securable in a first socket of said carriage to secure said printer cartridge to said carriage.

16. The printer of claim 15 wherein said coupler further comprises a second socket of said cartridge frame and said carriage comprises a second prong which is selectively securable in said second socket.

17. The printer of claim 10 wherein said carriage comprises:

an endless belt mounted between a pair of pulleys;

a motor having a drive shaft engaging a first of said pair of pulleys; and, a coupling means for securing said carriage to said endless belt.

18. An electrophotographic reproduction machine, comprising:

a machine frame;

an electrophotographic printing mechanism mounted on said machine frame;

a sheet transport assembly mounted on said machine frame for moving sheets past said printing mechanism along a sheet path;

a carriage mounted on said machine frame for movement relative to said sheet path;

an ink jet printer frame removably secured to said carriage;

a thermal ink jet print head supported by said ink jet printer frame;

an ink supply container removably supported by said ink jet printer frame so that it communicates with said ink jet print head; and, a coupler for removably securing said ink jet printer frame to said carriage so that said ink jet printer frame, said ink jet print head, and said ink supply container can be removed from and secured to said carriage as a single unit.

19. The electrophotographic reproduction machine of claim 18 wherein said coupler comprises a prong of said ink jet printer frame which is selectively securable in a socket of said carriage to secure said ink jet printer frame to said carriage.

20. The electrophotographic reproduction machine of claim 18 wherein said carriage comprises:

an endless belt mounted between a pair of pulleys;

a motor having a drive shaft engaging a first of said pair of pulleys; and, a coupling means for securing said carriage to said endless belt.

21. The electrophotographic reproduction machine of claim 18 further comprising a cooling system for said ink jet print head, said cooling system comprising:

a cooling manifold secured to said ink jet print head;

a coolant supply reservoir secured to said office machine;

a cooling fluid inlet line having a first end communicating with said coolant supply reservoir and a second end communicating with said cooling manifold;

a cooling fluid outlet line having a first end communicating with said coolant supply reservoir and a second end communicating with said cooling manifold in a manner spaced from said cooling fluid inlet line; and, a pump communicating with said coolant supply reservoir for pumping cooling fluid into said cooling fluid inlet line.

22. The printer of claim 10 wherein information printed by said thermal ink jet printhead is controlled by a programming means.

23. A method of printing on a sheet comprising the steps of:

providing a first printer, a second printer, mounted on a movable carriage, and a sheet transport assembly which moves a sheet along a sheet path;

moving a sheet past said first printer along the sheet path;

employing said first printer to print on the sheet;

selectively actuating a carriage drive assembly to move the carriage on which said second printer is mounted to move said second printer into the sheet path;

employing said second printer to print on the sheet traveling therepast; and, programming said second printer to print a desired indicium on the sheet traveling therepast with a programming means connected to said second printer.

24. The method of claim 21 wherein said second printer includes a frame removably secured to said carriage and an ink cartridge of a first color removably secured to said frame and further comprising the steps of;

selectively removing the ink cartridge from said second printer frame; and, replacing said ink cartridge with another ink cartridge of a different color.

* * * * *